March 8, 1960 H. M. STERN 2,927,791
CARD PROCESSING APPARATUS
Filed Dec. 12, 1955 4 Sheets-Sheet 1

HANS M. STERN
INVENTOR.

BY Ellsworth R. Roston
ATTORNEY

HANS M. STERN
INVENTOR.

March 8, 1960 H. M. STERN 2,927,791
CARD PROCESSING APPARATUS
Filed Dec. 12, 1955 4 Sheets-Sheet 3

HANS M. STERN
INVENTOR.

BY
Ellsworth R. Roston
ATTORNEY

March 8, 1960 H. M. STERN 2,927,791
CARD PROCESSING APPARATUS
Filed Dec. 12, 1955 4 Sheets-Sheet 4

HANS M. STERN
INVENTOR.

BY
Ellsworth R. Roston
ATTORNEY

United States Patent Office 2,927,791
Patented Mar. 8, 1960

2,927,791

CARD PROCESSING APPARATUS

Hans M. Stern, Los Angeles, Calif., assignor to The Magnavox Company, Los Angeles, Calif., a corporation of Delaware Application December 12, 1955, Serial No. 552,506

24 Claims. (Cl. 271—11)

This invention relates to apparatus for processing information cards and more particularly to apparatus for controlling the release of the cards at particular times from an input stack.

A large number of computers and data processing systems have been built in recent years to solve complex mathematical problems and to perform complex business operations previously incapable of being performed by machine. For example, data processing systems have been built to control inventory and the pricing of merchandise in large department stores. Data processing systems have also been built to assimilate and record information relating to all of the transactions occurring daily in such large institutions as banks and stock brokerage firms. By assimilating and recording such information, complex operations such as in department stores and banks have been considerably simplified.

In one type of data processing system, the digital information relating to the different items is stored in a plurality of cards. Since there may be as many as millions of bits of information in complex data processing systems, hundreds of thousands of cards sometimes have to be used. These cards are stored in one or more input stacks in a particular order dependent upon the information in the cards.

For certain operations, successive cards have to be withdrawn continuously from the input stack. For other types of operation, the cards must be withdrawn only intermittently and in accordance with the introduction of control signals. For example, an intermittent withdrawal of cards may be required when the cards from two or more input stacks are compared for information and are arranged in one or more other stacks in accordance with such information. These operations may include merging and collating.

This invention provides apparatus for controlling the withdrawal of cards from an input stack to a rotatable drum for movement on the drum. The invention includes apparatus for normally preventing transfer of cards from the input stack to the drum. Upon the occurrence of a control signal, the apparatus operates to obtain a removal of one or more cards from the stack to the drum. The apparatus operates to obtain the transfer of cards to the drum by controlling the flow of fluid past a control position. By using fluid to control the withdrawal of cards from the input stack, a positive action can be obtained on an intermittent basis withdrawing cards from the input stack.

The withdrawal of cards from the input stack can be controlled by the use of a retainer and by the imposition of a vacuum force on the retainer. When the vacuum force is exerted on the retainer, the retainer presses the cards against it and exerts a friction force for preventing the cards from becoming transferred to the drum. The friction force exerted by the retainer prevents the cards from becoming transferred to the drum even though the drum exerts a friction force against the cards for transferring the cards to the drum from the input stack.

Upon the interruption of the vacuum in the retainer, the friction force exerted by the drum becomes predominant and the cards become transferred to the drum. Electrical circuitry is included for obtaining an interruption of the vacuum force at particular times so that the cards become transferred to the drum on an intermittent basis.

Figure 6:
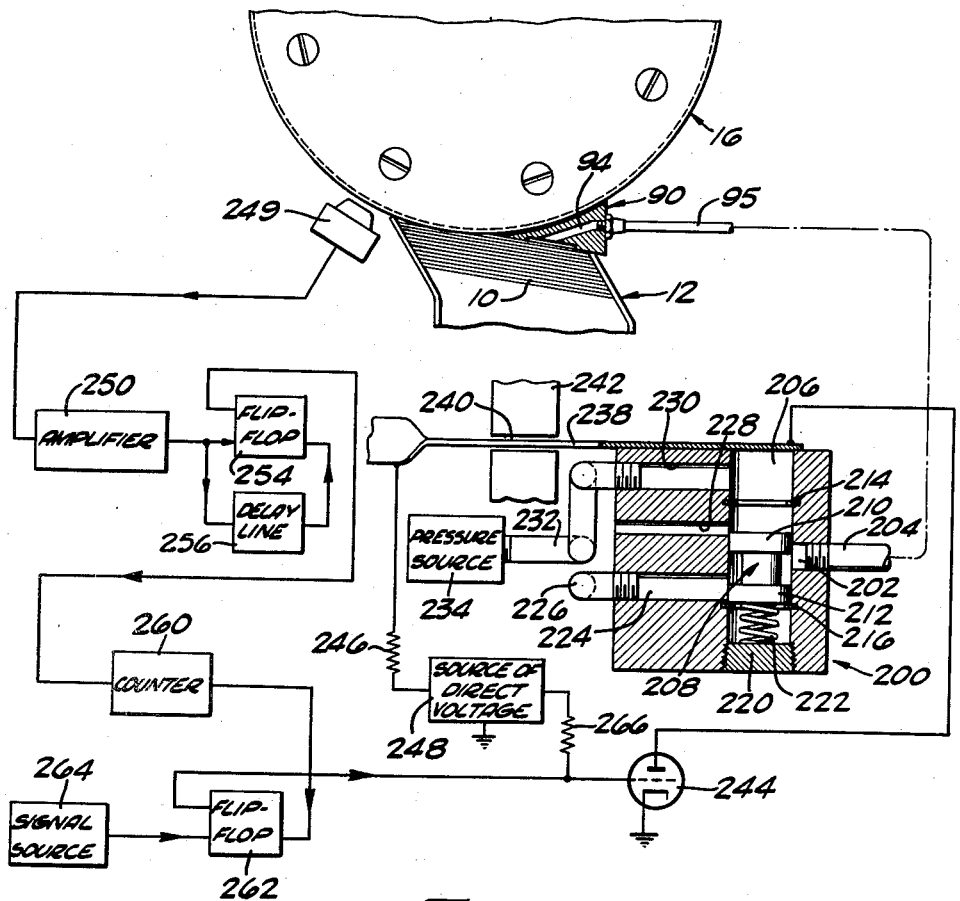
Figure 7:
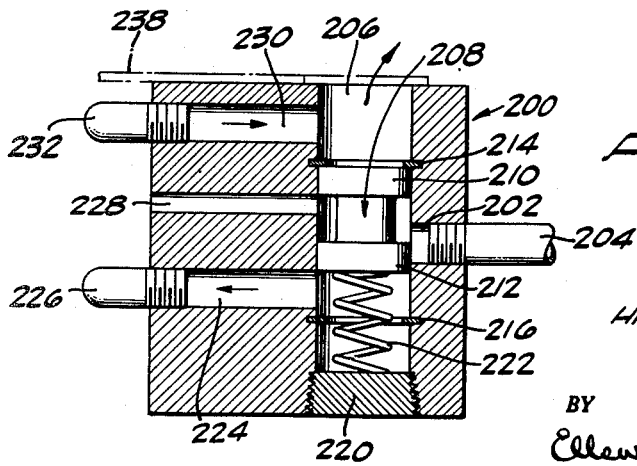

Figure 6 is a view somewhat schematically illustrating the mechanical and electrical features constituting a second embodiment of the invention and is partly in block form from an electrical standpoint and is partly in plan and partly in section from an electrical standpoint, the sectional portion showing a valve assembly in the position for preventing the removal of cards from an input stack; and Figure 7 is an enlarged sectional view of the valve assembly shown in Figure 6 and illustrates the disposition of various members in the assembly when a card is being withdrawn from the input stack.

In the embodiment of the invention shown in Figures 1 to 5, inclusive, a plurality of cards 10 (Figure 1) are disposed in a stack 12 formed by a pair of parallel walls 14. The walls 14 are inclined as at 15 at their forward end in a direction corresponding to the direction of rotation of a drum generally indicated at 16. As will be described in detail subsequently, the drum 16 is disposed in contiguous relationship to the input stack 12 such that it is able to withdraw cards by friction from the stack for movement on the drum.

Figure 1:
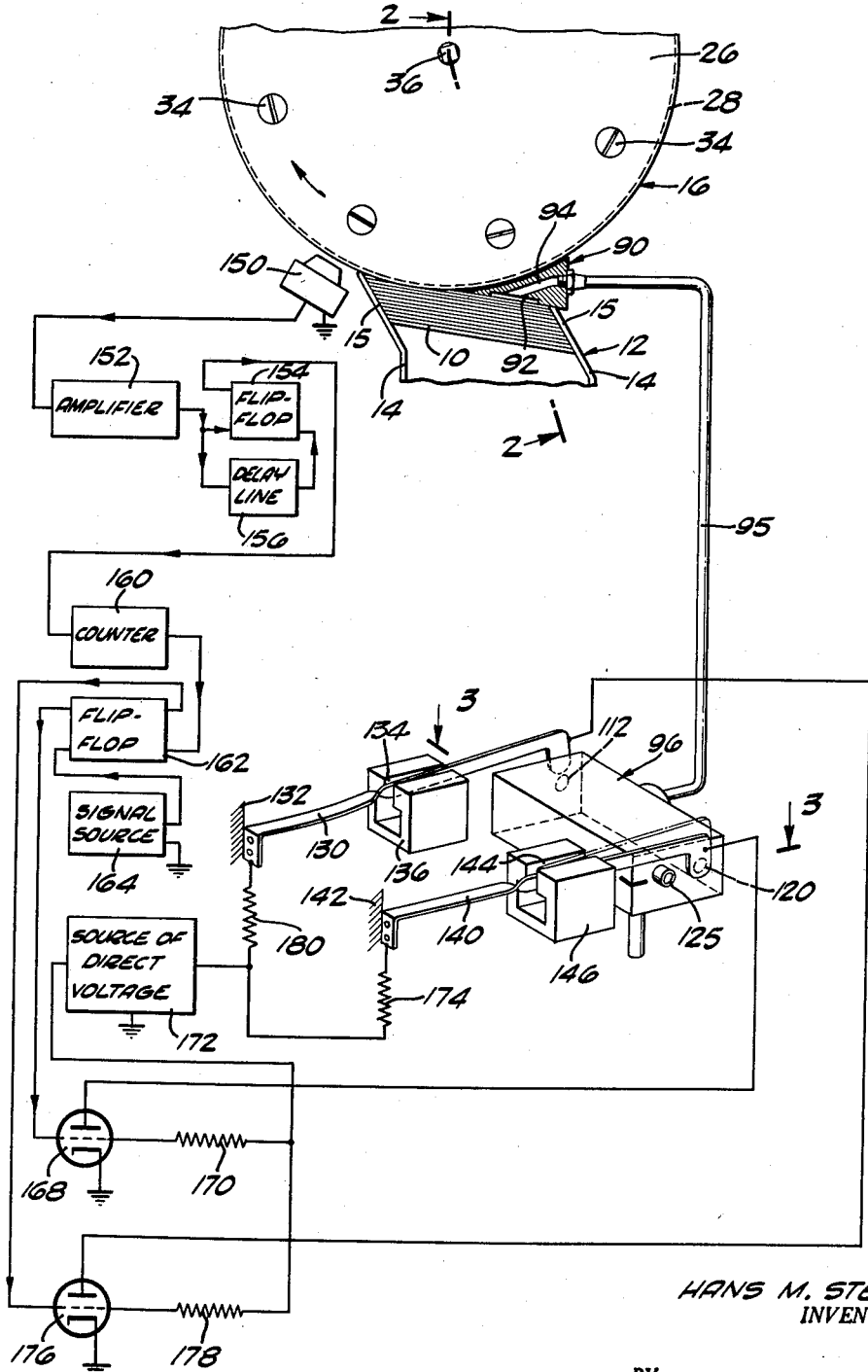
Figure 1 is a view somewhat schematically illustrating the mechanical and electrical features constituting one embodiment of the invention and is partly in block form from an electrical standpoint and partly in plan and partly in perspective from a mechanical standpoint, one of the members being shown in solid lines in one position and in broken lines in a second position.

The faces of each card 10 are disposed in a substantially vertical plane extending in a somewhat lateral direction between the walls 14. A plurality of bits of information is adapted to be provided on one face or both faces of each card 10. Each bit of information by itself or in combination with other bits represents information in digital form. The information may relate to numbers, alphabetical letters, combinations of number and letters (alphanumeric coding) or any other pertinent matter. The bits of information may be disposed in rows, each of which extends in a direction substantially parallel to the other rows. In Figure 1, the rows of information would extend in a horizontal direction laterally along the cards.

The bits of information may be provided in any suitable form on each card 10. For example, the information may be represented by holes or the absence of holes at the different positions. Preferably, the information is represented in magnetic form. In this form, magnetic fluxes of one polarity at a position may represent an indication of "0" or a "false" state and magnetic fluxes of an opposite polarity at a position may represent an indication of "1" or a "true" state.

As previously described, the drum 16 is disposed in contiguous relationship to the input stack 12. The drum 16 includes a pair of exterior plates 26 (Figure 2) defining a housing and having inwardly disposed lip portions 28 at their peripheries. A second pair of plates 30 are disposed wtihin the compartment defined by the plates 26 and are positioned in spaced relationship to the plates 26 as by spacers 32 mounted on studs 34. The studs 34 extend through the plates 26 and 30 at positions near the peripheries of the plates to maintain the plates in fixed position relative to one another. A plug 36 also extends into a threaded socket in the upper plate 26 at the annular center of the plate.

The radius of the plates 30 is slightly less than that of the plates 26 by a distance corresponding substantially to the thickness of the cards 10 so as to form a neck portion 38 relative to the periphery of the plates 26. Each of the plates 30 has annular flange portions 40 extending axially from both faces of the plate 30 at the periphery of the plate. The flange portions 40 are so formed as to produce slots 42 between the plates 30 and between the flanges on the plates 30 and the lip portions 28 on the plates 26. The slots 42 communicate with suction passageways 46 formed between adjacent plates by the inclusion of the spacers 32.

The drum 16 is disposed against an annular collar 52 provided at one end of a hollow shaft 54. Bearings 56 are provided at opposite ends of the shaft 54. The inner races of the bearings 56 are mounted on the shaft and the outer races of the bearings are disposed against bushings 58 secured to a housing 60 as by studs 62. Seals 64 are disposed at opposite ends of the bearings to prevent the leakage of lubricating fluid from the bearings.

A hole 66 is provided in the housing 60 at a position between the bearings 56. The hole 66 is provided so that a belt 68 can extend into the housing and around a pulley 70. The pulley 70 is suitably positioned within the housing 60 as by sleeves 72 mounted on the shaft 54 between the bearings 56. In this way, the shaft 54 can be rotated by a suitable motor (not shown).

The bearings 56 and the sleeve 72 are maintained in fixed position on the shaft 54 as by a lock washer 74 and a nut 76. The nut 76 is adapted to be screwed on a threaded portion at the bottom of the shaft 54. A sealing disk 78 is also adapted to be screwed on the threaded portion of the shaft 54. The sealing disk 78 operates in conjunction with a bottom plate 80 to prevent movement of air between the interior of the housing 60 and the interior of the hollow shaft 54 upon a difference in pressure between the housing and the shaft.

The plate 80 is secured to the housing 60 as by studs 82. A hollow conduit 84 is in turn disposed by a push-fit within the plate 80. In this way, air can be exhausted from the hollow interiors of the shaft 54 and the conduit 84 as by a vacuum pump 86. Although the pump 86 is shown in block form in Figure 2, it should be appreciated that any suitable type of pump can be used.

A retainer generally indicated at 90 (Figures 1 and 2) is disposed in contiguous relationship to the drum 16 at a retarded position with respect to the input stack 12 in a counterclockwise direction. The retainer 90 extends into the stack 12 at the rear end of the stack to contact the first card 10 in the stack at a trailing position in the counterclockwise direction. The retainer 90 may be provided with a rough surface adjacent the cards 10 to exert a large frictional force against the face of the card 10 which it contacts. The retainer is also provided with one or more orifices 92 which are disposed in contiguous relationship to the retainer 90. As will be described in detail subsequently, the orifices 92 are included to exert a vacuum force against the cards 10 for retaining the cards within the input stack 12.

Conduits 94 extend through the retainer 90 from the orifices 92 and communicate with a pipe 95 leading to a valve housing generally indicated at 96. The conduit 94 communicates through the pipe 95 with a port 98 in the housing 96 and the port 98 in turn communicates with a chamber 100. The chamber 100 extends through the housing 96 in a direction transverse to the port 98 to communicate with the atmosphere at opposite ends of the housing. The chamber 100 is shown in the drawings as extending in a substantially vertical direction and is preferably cylindrical in shape. The chamber 100 is also adapted to communicate with the atmosphere through an exhaust orifice 102 disposed at an intermediate position between the mouths of the chamber. The exhaust orifice 102 extends through the housing 96 in a direction transverse or substantially perpendicular to the chamber 100.

A piston 104 is movable within the chamber 100. The piston 104 includes a stem and a pair of spools 106 and 108 extending from the stem at opposite ends of the stem. The spools 106 and 108 are provided with dimensions to fit snugly within the chamber 100. The spool 106 is positioned near the exhaust orifice 102 to prevent in one position the exhaust orifice from communicating wtih a vacuum line hereinafter to be described. The spool 106 is movable to a second position to obtain a communication between the exhaust orifice 102 and the vacuum line. A helical spring 110 is disposed between the outer face of the spool 106 and a hollow plug 112 which screws into the mouth at the upper end of the chamber 100 in Figures 3 and 4. A sealing ring 114 is secured to the wall of the chamber 100 at a position between the spool 106 and the shoulder 112 to limit the upward movement of the spool.

Figure 3:
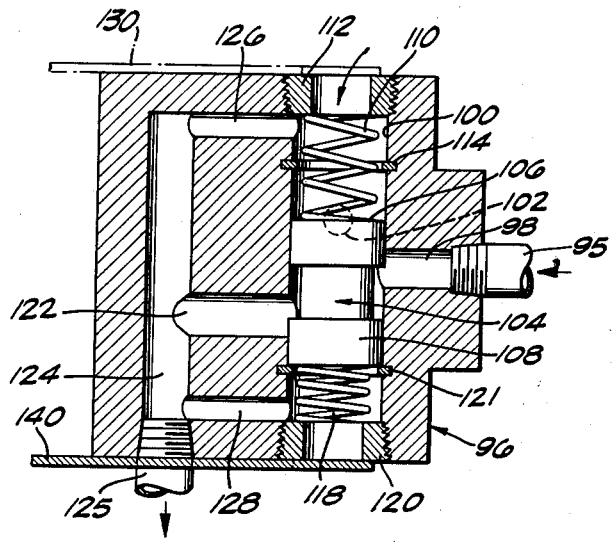
Figure 3 is an enlarged sectional view substantially on the line 3—3 of Figure 1 and illustrates in some detail a valve assembly constituting an important part of the embodiment shown in Figures 1 and 2, the different components in the valve assembly being positioned to prevent the transfer of cards from the input stack.
Figure 4:
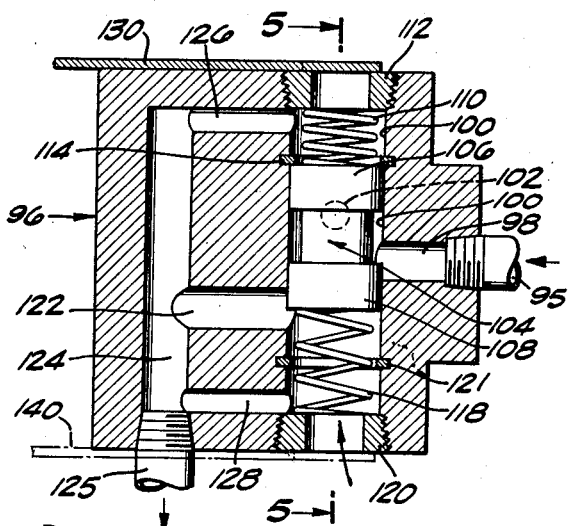
Figure 4 is an enlarged sectional view similar to that shown in Figure 3 and illustrates the disposition of the different members in the valve assembly when a card is being withdrawn from the input stack by the drum shown in Figure 2.

In like manner, a helical spring 118 is disposed between the spool 108 and a hollow plug 120 which screws into the mouth of the chamber 100 at the lower end of the chamber in Figures 3 and 4. A sealing ring 121 is supported by the wall of the chamber 100 at a position between the spool 108 and the plug 120 to limit the downward movement of the spool. The spool 108 is disposed in contiguous relationship to a conduit 122 to block the flow of fluid through the conduit in one position of the spool. The spool 108 is movable to a second position to provide a communication through a fluid circuit including the conduit 122, the chamber 100 and the port 98.

Figure 2:
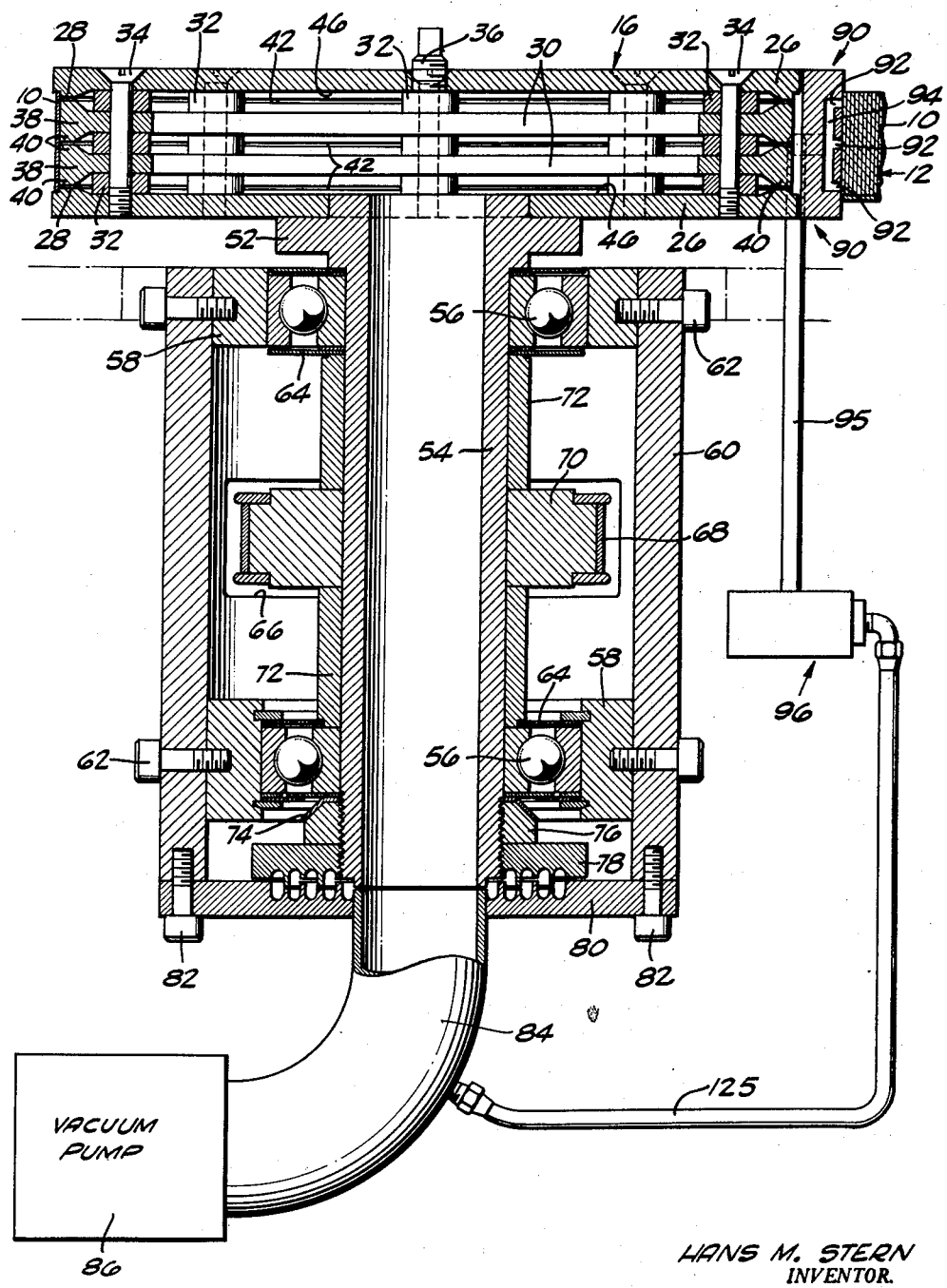
Figure 2 is an enlarged sectional view substantially on the line 2—2 of Figure 1 and illustrates in further detail the construction of a drum shown in Figure 1 and the disposition of the drum relative to the cards in an input stack.

The conduit 122 in turn communicates with a line 124 connected through a pipe 125 to the conduit 84 in Figure 2. Passageways 126 and 128 also communicate at one end with the line 124 and at the opposite end with the chamber 100. The passageway 126 communicates with the chamber 100 at a position between the plug 112 and the spool 106, and the passageway 128 communicates with the chamber 100 at a position between the spool 108 and the plug 120.

A spring 130 is adapted to be positioned in contiguous relationship to the mouth at the upper end of the chamber 100 in Figures 3 and 4. In this position, the spring 130 is adapted to close the mouth at the upper end of the chamber 100 against the passage of fluid through the mouth. The spring 130 is supported by a wall 132 (Figure 1) at its opposite end such that it can be flexed away from the mouth of the chamber 100 about the wall as a fulcrum. At an intermediate position along its length, the spring 130 extends through an air gap 134 in a permanent magnet 136. The magnet 136 has a closed loop interrupted only by the air gap 134. It should be appreciated that an electromagnet may be used in which flux is produced in the air gap 134 by the flow of current through a winding associated with the magnet.

In like manner, one end of a spring 140 is adapted to be positioned in contiguous relationship to the mouth at the lower end of the channel 100 in Figures 3 and 4. The spring 140 is attached at its opposite end to a wall 142 so that it can be flexed about the wall as a fulcrum to a position opening the channel 100. At an intermediate position, the spring extends through an air gap 144 in a permanent magnet 146. The magnet 146 has a configuration corresponding substantially to the magnet 136. The magnet 146 may be an electromagnet magnetically energized by the flow of current through an associated winding.

As shown in Figure 1, one or more transducing members are disposed in contiguous relationship to the drum 16. The transducing members may also be coupled to a drum (not shown) associated with the drum 16 to receive cards from the drum. Only a transducing member 150 is shown in Figure 1, but it should be appreciated that any other number of transducing members can be used in accordance with the different number of horizontal rows of information on the cards 10. The transducing members such as the member 150 are disposed in contiguous relationship to the periphery of the drum 16 at an angular position removed from the input stack 12 in the direction of rotation of the drum. In Figure 1, the transducing member 150 is shown as being displaced in a clockwise direction from the input stack 12.

Each of the transducing members such as the member 150 is provided with magnetic means such as a coil (not shown) when magnetic information is recorded on the cards 10. The coil in each transducing member such as the member 150 is so disposed as to be coupled to the cards 10 during the movement of the cards past the transducing member on the periphery of the drum 16. As will be described in detail subsequently, the transducing members such as the member 150 are connected to "read" the magnetic indications on the different cards and to convert these magnetic indications into a corresponding pattern of electrical signals. The transducing member such as the member 150 may also be connected to record magnetic information on the cards 10 by converting electrical signals into a corresponding pattern of magnetic signals on the cards.

An amplifier 152 (Figure 1) is connected to the transducing member 150 to receive the signals induced in the member when the member is used to "read" magnetic information on the cards 10. The output signals from the amplifier 152 are introduced to an input terminal of a flip-flop 154. The flip-flop 154 may be constructed in a manner similar to that described on pages 164 to 166, inclusive, of volume 19 entitled "Wave Forms" of the Radiation Laboratory Series published in 1949 by the Massachusetts Institute of Technology. The flip-flop 154 may be provided with two input terminals designated for convenience as the "left" and "right" input terminals. The output signals from the amplifier 152 are shown in Figure 1 as being introduced to the left input terminal of the flip-flop 154.

The signals from the amplifier 152 also pass to an input terminal of a delay line 156 as well as to the left input terminal of the flip-flop 154. The delay line 156 is adapted to provide a delay equal to substantially one half of the time required for adjacent vertical columns on the cards 10 to move past the transducing members such as the member 150. The purpose of the delay line 156 is to operate in conjunction with the flip-flop 154 to provide clock signals in the flip-flop as will be described in detail subsequently. A connection is made from the output terminal of the delay line 156 to the right input terminal of the flip-flop 154.

The flip-flop 154 also has two output terminals designated for convenience as the "left" and "right" output terminals. Although the flip-flop 154 is provided with two output terminals, only one of the output terminals designated as the left output terminal is used. In Figure 1, the signals on the left output terminal of the flip-flop 154 are shown as being introduced to the input terminal of a counter 160. The counter 160 may be formed in a conventional manner from a plurality of flip-flops connected in a cascade arrangement. In such an arrangement, each flip-flop is adapted to be triggered by a signal from the preceding flip-flop when the preceding flip-flop operates in a particular one of its two states. An output signal is produced in the counter 160 upon the occurrence of a particular count in the counter. The output signals from the counter 160 are introduced to the right input terminal of a flip-flop 162. The flip-flop 162 may be constructed in a manner similar to the flip-flop 154.

Signals from a source 164 are adapted to be introduced to the left input terminal of the flip-flop 162. The source 164 may be any suitable apparatus for producing signals at intermittent times to obtain a transfer of cards from an input stack such as the stack 12 to a drum such as the drum 16. For example, suitable apparatus for use as the signal source 164 is disclosed in co-pending application Serial No. 529,886, filed August 22, 1955, by Alfred M. Nelson et al. The source 164 may also be constructed in a manner similar to that disclosed in Carroll Patent 1,710,691 and Holland-Martin Patent 2,539,998. In both of these patents, certain cards are selected such that an output signal is produced by means equivalent to the source 164 upon each such selection.

The signals on the left output terminal of the flip-flop 162 are applied to the grid of a tube 168. The grid of the tube 168 may be negatively biased through a resistance 170 from a first terminal of a source 172 of direct voltage so as to maintain the tube normally non-conductive. The cathode of the tube 168 is grounded and the plate of the tube is connected to the spring member 140 at a position near the chamber 100. One terminal of a resistance 174 has a common connection with the spring member 140 at a position near the wall 142. The other terminal of the resistance 174 is connected to the voltage source 172 to receive a positive potential from a second terminal of the source.

Just as the voltage on the left output terminal of the flip-flop 162 is applied to the grid of the tube 168, the voltage on the right output terminal of the flip-flop is applied to the grid of a tube 176. The grid of the tube 176 may be biased through a resistance 178 from the negative terminal of the source 172 to inhibit the flow of current through the tube. The cathode of the tube 176 is grounded and the plate of the tube is connected to the spring member 130 at a position near the chamber 100. An electrical connection is made from the free end of the spring member 130 to one terminal of a resistance 180, the other terminal of which is adapted to receive a positive potential from the source 172.

Since the drum 16 is coupled to the shaft 54 (Figure 2), it rotates with the shaft when the shaft is driven by the belt 68. The housing 60 remains stationary as the shaft 54 rotates because of the operation of the bearings 56, and the conduit 84 also remains stationary since it is push-fit into the plate defining the bottom of the housing. Even though the shaft 54 is rotating relative to the conduit 84, the vacuum pump 86 is able to withdraw air through the continuous passageway formed by the shaft and the conduit. This results from the operation of the disc 78 and the plate 80 in producing a seal at the junction between the shaft 54 and the conduit 84.

The vacuum created by the pump 86 causes air to be withdrawn from the drum 16 through the passageways 46 and the hollow contours of the shaft 54 and the conduit 84. Since the slots 42 communicate with the passageways 46, an inward pressure is created on the periphery of the drum 16 upon the operation of the vacuum pump 86. This inward pressure is instrumental in maintaining the cards 10 in fixed position on the periphery of the drum 16 as the drum rotates. The cards 10 become positioned on the periphery of the drum 16 in a manner which will be described in detail subsequently.

In the normal operation of the electrical circuitry shown in Figure 1, a relatively high voltage is normally produced on the right output terminal of the flip-flop 162. This voltage is introduced to the grid of the tube 176 to make the tube conductive. Current then flows through a circuit including the voltage source 172, the resistance 180, the spring 130 and the tube 176. The flow of current through the spring 130 produces in the member a magnetic field which extends in a horizontal direction in the plane formed by the drawings. At the same time, a magnetic field is produced in the spring 130 by the flux extending through the air gap 134 of the permanent magnet 136. This magnetic field extends in a horizontal direction in a plane substantially perpendicular to the plane of the drawings. Because of the magnetic fields produced in the spring 130 in two substantially perpendicular directions, a force is exerted on the spring 130 in a third direction substantially perpendicular to the first two directions. This force extends in a substantially vertical direction in the plane formed by the drawings. The force exerted on the spring 130 causes the spring to pivot about the wall 132 as a fulcrum so that its free end moves upwardly in Figure 1 to a position away from the adjacent mouth of the channel 100. This may be best seen in Figure 3. When the mouth at the upper end of the channel 100 in Figure 3 becomes open, air at atmospheric pressure enters into the chamber in the space above the spool 106. The air cannot move downwardly in Figure 3 past the spool 106 since the spool has a snug fit within the chamber 100.

Since the line 124 is connected through the pipe 125 and the conduit 84 to the vacuum pump 86, air is withdrawn by the pump through a fluid circuit including the portion of the chamber 100 below the spool 108, the passageway 128, the line 124, the pipe 125 and the conduit 84. This causes the space in the chamber 100 below the spool 108 to become evacuated. The vacuum is created in the chamber 100 below the spool 108 in Figure 3 since the spool fits snugly within the chamber and since the spring 140 blocks the mouth at the lower end of the chamber 100 in Figure 3.

By maintaining at a vacuum the portion of the chamber 100 below the spool 108 and by maintaining at atmospheric pressure the portion of the chamber above the spool 106, a downward force is exerted upon the piston 104. This causes the piston 104 to move downwardly against the action of the springs 110 and 118. When the piston 104 has moved down a sufficient distance, the spool 108 becomes positioned below the passageway 122. Because of this, a continuous circuit for the flow of air is obtained from the pump 86 through the conduit 84, the pipe 125, the line 124, the passageway 122, the chamber 100, the port 98, the pipe 95, the line 94 and the orifices 92. This continuous circuit for the flow of air is shown in Figure 3. Air is sucked through this fluid circuit so as to produce a vacuum force at the orifices 92. This vacuum force causes the card 10 adjacent the orifices 92 to be pressed against the retainer 90.

When the card 10 contiguous to the retainer 90 is pressed against the retainer, the retainer exerts a retarding force for inhibiting the transfer of the card from the input stack 12 to the drum 16. This retarding force is exerted against the trailing portion of the card 10 in Figure 1. At the same time, the drum 16 acts to exert a force against the leading portion of the card in a manner similar to that described above. The force exerted by the drum 16 is in a direction for obtaining a transfer of the card from the input stack 12 to the drum. However, the retarding force exerted by the retainer 90 is greater than the force exerted by the drum 16 for removing the card from the input stack. This results at least in part from the dimensions of the orifices 92 and may result in part by producing a rough surface on the retainer 90. In this way, cards 10 are prevented from leaving the input stack 12 when a vacuum is produced in the orifices 92.

At a particular time, a signal may be produced by the source 164. This signal may be produced upon the occurrence of certain phenomena dependent upon the system in which the source 164 is included. For example, the signal may be produced in a merging system or a collating system every time that one of the cards 10 is transferred to an output stack. The signal from the source 164 passes to the left input terminal of the flip-flop 162 and triggers the flip-flop to its "true" state. The "true" state of operation of the flip-flop 162 is represented by a relatively high voltage on the left output terminal of the flip-flop and by a relatively low voltage on the right output terminal of the flip-flop.

Figure 5:
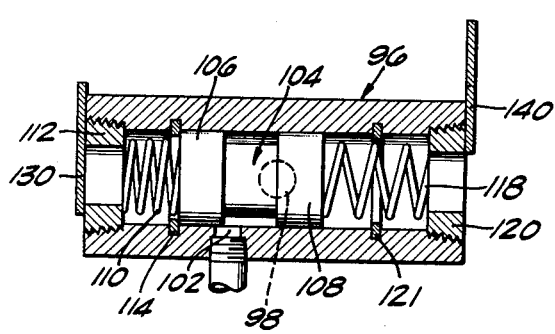
Figure 5 is an enlarged sectional view substantially on the line 5—5 of Figure 4 and illustrates in further detail the disposition of the different members in the valve assembly when a card is being withdrawn from the input stack by the drum shown in Figure 2.

When a low voltage is produced on the right output terminal of the flip-flop 162, it causes the tube 176 to become cut off and prevents current from flowing through the spring member 130. Because of the interruption in the flow of current through the spring member 130, the force exerted on the spring member 130 for pivoting the member becomes interrupted. This causes the spring member 130 to return to its position contiguous to the mouth at the upper end of the chamber 100, as best seen in Figures 4 and 5. Since the mouth at the upper end of the chamber 100 now becomes blocked, a vacuum is produced in the chamber above the spool 106 by the withdrawal of air through the passageway 126 and the line 124.

As previously described, a relatively high voltage is produced on the left output terminal of the flip-flop 162 in Figure 1 when a signal from the source 164 is introduced to the left input terminal of the flip-flop. The high voltage produced on the left output terminal of the flip-flop 162 causes the tube 168 to become conductive and current to flow through a circuit including the source 172, the resistance 174, the spring 140 and the tube 168. The flow of current through the spring 140 causes a magnetic field to be produced in a direction substantially perpendicular to the field produced by the magnet 146 across the air gap 144. These quadrature fields in turn produce a force which acts upon the spring 140 to pivot the spring upwardly in Figure 1 to a position away from the adjacent mouth. This is best seen in Figure 5. By opening the mouth at the lower end of the chamber 100 in Figure 4, air at atmospheric pressure can enter into the portion of the chamber below the spool 108.

Since the lower portion of the chamber 100 is at atmospheric pressure and the upper portion of the chamber is at a pressure considerably below atmospheric, a force is exerted on the piston 104 in an upward direction in Figure 3. This causes the spool 106 to move above the exhaust orifice 102 in Figure 4 so that the portion of the chamber 100 between the spools 106 and 108 can become exposed to atmospheric pressure. Because of this, air flows through a fluid circuit including the exhaust orifice 102, the portion of the chamber 100 between the spools 106 and 108, the port 98, the pipe 95, the line 94 and the orifices 92.

The air flowing through the fluid circuit described in the previous paragraph causes the vacuum pressure at the orifices 92 to be removed so that no further retarding force is exerted on the trailing portion of the card 10 contiguous to the retainer 90. Actually, the flow of air through this circuit causes an instantaneous force to be exerted against the cards 10 in a direction for moving the cards away from the retainer 90. In this way, the removal of the vacuum in the retainer 90 provides a positive action in preparing the card 10 contiguous to the drum 16 for removal by the drum.

When the restraining force exerted on the cards 10 through the orifices 90 becomes interrupted, the force exerted by the drum 16 on the card 10 contiguous to the drum becomes predominant. This causes the drum 16 to remove the first card 10 from the stack 12 by the action of friction. Actually, the force exerted by the drum 16 on the card 10 may even increase during this time to insure a positive action of removing the card to the drum. The reason is that the vacuum pump 86 has only to withdraw air through the slots 42 and the passageways 46 in the drum because of the interruption of its action in withdrawing fluid through the orifices 92. The withdrawal of air through the slots 42 and the passageways 46 in the drum 16 causes the card 10 to remain fixedly positioned on the periphery of the drum after the card has been withdrawn from the input stack.

Upon the withdrawal of a card 10 from the input stack 12, the card moves with the drum past the transducing members such as the member 150. As each vertical column moves past the member 150, a positive signal is induced in the member to represent an indication of "1." This results from the fact that the card 10 is magnetically polarized with flux indicative of the binary value "1" in every position along a horizontal row contiguous to the transducing member 150.

The positive signals induced in the transducing member 150 are amplified and inverted by the stage 152 and are introduced as negative triggering signals to the left input terminal of the flip-flop 154. These signals trigger the flip-flop 154 to its "true" state, as represented by a relatively high voltage on the left output terminal of the flip-flop. Each signal from the amplifier 152 also passes to the delay line 156. The line 156 delays the signal for a period of time equal to substantially one-half of the time required for adjacent vertical columns of the card 10 to move past the transducing members such as the member 150.

The signal from the delay line 156 passes to the right input terminal of the flip-flop 154 and triggers the flip-flop to its "false" state, as represented by a relatively high voltage on the right output terminal of the flip-flop and a relatively low voltage on the left output terminal of the flip-flop. In this way, the flip-flop 154 becomes alternately triggered to its "true" and "false" states to produce clock signals. Each clock signal represents the movement of a vertical column on the cards 10 past the transducing members such as the member 150.

The clock signals produced on the left output terminal of the flip-flop 154 are introduced to the counter 160. The counter 160 operates to count the number of signals introduced to it and to provide an individual indication for each different value. When the last vertical column on the card 10 moves past the transducing members such as the member 150, a particular indication is produced in the counter 160. This particular indication causes a signal to be produced on the output line of the counter 160. The particular indication also causes a new count to be initiated by the counter 160.

The signal from the counter 160 is introduced to the right input terminal of the flip-flop 162. The signal triggers the flip-flop 162 to its "false" state, as represented by a relatively high voltage on the right output terminal of the flip-flop and a relatively low voltage on the left output terminal of the flip-flop. The low voltage on the left output terminal of the flip-flop 162 causes the current flowing through the tube 168 and the spring 140 to become interrupted. When this occurs, the spring 140 returns to its position blocking the mouth at the lower end of the chamber 100 in Figures 3 and 4.

A high voltage is produced on the right output terminal of the flip-flop 162 at the same time that a low voltage is produced on the left output terminal of the flip-flop. This high voltage makes the tube 176 conductive and causes current to flow through the tube and the spring 130. The spring 130 becomes actuated to a position away from the mouth at the upper end of the chamber 100 in Figures 3 and 4 when current flows through the spring.

As previously described, a friction force is exerted against the cards 10 by the retainer 90 when the spring 130 is positioned away from the chamber 100 and the spring 140 is disposed in contiguous relationship to the chamber. This friction force prevents the removal of any further cards by the drum 16 from the input stack 12, at least until the production of the next signal by the source 164. In this way, an intermittent transfer of the cards 10 from the input stack 12 is obtained in accordance with the production of signals by the source 164.

It should be appreciated that the particular indication in the counter 160 does not necessarily have to occur when the last position on the card moves past the transducing member 150. For example, the particular indication can occur in the counter 160 after any other number of positions on the card 160 have moved past the transducing member 150. This number of positions may correspond to the number of positions disposed in front of the orifices 92. By producing the particular indication only after such a number of signal indications has moved past the transducing member 90, only one card can be removed by the drum 16 from the input stack 12 at any one time.

The particular indication corresponding to that produced by the counter 160 may be obtained in other ways. For example, the particular indication may be produced a fixed interval of time after one of the cards 10 starts to become removed from the stack 12. The particular indication may also be produced by inserting a mark on the card and by using a photoelectric cell to detect the card. The mark may be at a position in which the card 10 being removed from the input stack 12 has moved past the orifices 92.

The apparatus shown in Figures 6 and 7 forms another embodiment of the invention. The apparatus includes the input stack 12, the drum 16 and the retainer 90, all of which are included in the previous embodiment. The apparatus also includes a valve assembly generally indicated at 200. A port 202 is provided in the valve assembly 200 and is connected by a pipe 204 to the conduit 94 in the retainer 90. The port 202 in turn communicates with a chamber 206 shown in Figures 6 and 7 as extending in a vertical direction completely through the housing 204. The chamber 206 preferably has an annular configuration.

A piston 208 having a pair of spools 210 and 212 is slidable in the chamber 206. The spools 210 and 212 are disposed at opposite ends of the piston 208 and are provided with dimensions to fit snugly within the chamber 206. A sealing ring 214 extends into the chamber 206 at a position between the spool 210 and the mouth at the upper end of the chamber, as seen in Figures 6 and 7. The sealing ring 214 is positioned in the chamber 206 to limit the upward movement of the piston 208 in Figures 6 and 7.

In like manner, a sealing ring 216 is disposed within the chamber 206 at a position between the spool 212 and the mouth at the lower end of the chamber in Figures 6 and 7 to limit the downward movement of the piston 208. The mouth at the lower end of the chamber 206 in Figures 6 and 7 is completely closed by a plug 220 having a threaded periphery for screwing into a tapped portion of the chamber. A helical spring 222 is disposed under compression between the spool 212 and the plug 220.

The spool 212 is positioned adjacent to a passageway 224 which communicates at one end with the chamber 206 and at the other end with a pipe 226 extending into the conduit 84. Similarly, the spool 210 is positioned adjacent to a passageway 228 which communicates at one end with the atmosphere and at the other end with the chamber 206. A passageway 230 extends at one end into the chamber 206 at a position between the sealing ring 214 and the mouth at the upper end of the chambers in Figures 6 and 7. At the other end, the passageway 230 communicates with a pipe 232 adapted to receive air under pressure from a source indicated in block form at 234 in Figure 6.

A spring 238 is disposed in one position in contiguous relationship to the mouth at the upper end of the chamber 206 in Figure 6. The spring 238 may be constructed in a manner similar to the springs 130 and 140 in Figure 1. The spring 238 extends through an air gap 240 in a permanent magnet 242, which may be constructed in a manner similar to the magnets 136 and 146 in Figure 1. One end of the spring 238 is electrically connected to the plate of a tube 244 and the other end of the spring may have a positive potential applied to it through a resistance 246 from a source 248 of direct voltage.

A transducing member 249 corresponding to the member 150 in Figure 1 is connected to the input terminal of an amplifier 250 having its output terminal connected to the left input terminal of a flip-flop 254 and to the input terminal of a delay line 256. The output signals from the delay line 256 pass to the right input terminal of the flip-flop 254. The signals on the left output terminal of the flip-flop 254 are introduced to a counter 260 corresponding to the counter 160 in Figure 1.

The output signals from the counter 260 in turn pass to the right input terminal of a flip-flop 262. A connection is made to the left input terminal of the flip-flop 262 from a signal source 264 corresponding to the signal source 164 in Figure 1. The signals produced on the left output terminal of the flip-flop 262 are in turn introduced to the grid of the tube 244. The grid of the tube 244 may be negatively biased through a resistance 266 from the voltage source 248 to inhibit the flow of current through the tube. The cathode of the tube 244 is grounded.

The flip-flop 262 normally operates with a relatively high voltage on its right output terminal and a relatively low voltage on its left output terminal. The relatively low voltage on the left output terminal of the flip-flop 262 is unable to overcome the negative bias introduced to the grid of the tube 244 from the source 248. This causes the tube 244 to remain non-conductive such that current cannot flow through the spring 238. Since current cannot flow through the spring 238, the spring remains in position contiguous to the mouth at the upper end of the channel 206 in Figures 6 and 7.

Because of its positioning in contiguous relationship to the mouth at the upper end of the chamber 206 in Figures 6 and 7, the spring member closes the upper end of the channel. This causes the pressure in the chamber 206 in the space between the spring 238 and the spool 210 to build up to a relatively high value. The pressure is built up in this region because of the continuous circuit established from the pressure source 234 through the pipe 232 and the passageway 230 to the portion of the chamber 206 above the spool 210. By producing a high pressure in the chamber 206 in the space above the spool 210, the downward force exerted upon the piston 208 exceeds any upward force exerted on the piston by the spring 222 and by the pressure of the fluid in the space between the spool 212 and the plug 220. This causes the piston 208 to move downwardly to a position approximating that shown in Figure 6.

In the positioning of the piston 208 shown in Figure 6, the spool 212 is disposed below at least a portion of the passageway 224. This causes a continuous fluid circuit to be established which includes the vacuum pump 86 in Figure 1, the conduit 84 in Figure 1, the pipe 226, the passageway 224, the portion of the chamber between the spools 210 and 212, the port 202, the pipe 204, the conduit 94 and the orifices 92. By establishing such a continuous circuit, the air in the orifices 92 is withdrawn by the pump 84 so that a vacuum is produced in the orifices. This vacuum is instrumental in producing a force at the trailing edge of the card 10 in a manner similar to that described above in connection with the embodiment shown in Figures 1 to 5, inclusive. The force exerted on the trailing edge of the cards 10 in the stack 12 exceeds the force of removal exerted by the drum 16 on the leading edge of the cards so that no cards can be withdrawn by the drum from the input stack.

Upon the introduction of a signal from the source 264 to the left input terminal of the flip-flop 262, the flip-flop becomes triggered to a "true" state of operation. In the "true" state of operation of the flip-flop 262, a relatively high voltage is produced on the left output terminal of the flip-flop. This voltage is introduced to the grid of the tube 244 to trigger the tube into a state of conductivity. Current then flows through a circuit including the voltage source 248, the resistance 246, the spring 238 and the tube 244. The current flowing through the spring 238 produces in the spring a magnetic field which acts in conjunction with the magnetic field produced by the magnet 242 to pivot the spring away from the mouth at the upper end of the chamber 206. The action of the magnetic fields in pivoting the spring 238 away from the mouth at the upper end of the chamber 206 is similar to that previously described in detail for the springs 130 and 140 in Figure 1.

When the spring 238 becomes pivoted to a position away from the mouth at the upper end of the chamber 206, the fluid introduced under pressure from the source 234 flows through a circuit including the pipe 232, the passageway 230 and the portion of the chamber 206 above the spool 210 and becomes vented to the atmosphere through the mouth at the upper end of the chamber. By exhausting the pressurized fluid from the source 234 to the atmosphere, atmospheric pressure is produced in the chamber 206 in the space above the spool 210. This causes the force exerted upwardly on the piston 208 by the spring 222 to exceed the downward force exerted on the piston by the atmospheric pressure above the spool 210. The piston 208 then moves upwardly to a position approximating that shown in Figure 7.

In the positioning of the piston 208 shown in Figure 7, the continuous circuit normally established between the vacuum pump 84 and the pipe 204 becomes blocked by the spool 212. At the same time, a continuous circuit is established which includes the passageway 228, the portion of the chamber 206 between the spools 210 and 212, the port 202, the pipe 204, the conduit 94 and the orifices 92. By establishing such a continuous circuit, the orifices 92 become vented to the atmosphere through the passageway 228. When this occurs, the restraining force exerted on the cards 10 at the trailing end of the cards becomes interrupted and the withdrawing force exerted by the drum 16 on the cards becomes predominant. This causes the first card 10 in the stack 12 to be withdrawn by the drum 16 from the stack.

As the first card in the stack 12 becomes transferred to the drum 16, it moves past the transducing member 249. Signals become induced in the transducing member 249 as each position on the card 10 in the horizontal row contiguous to the transducing member moves past the member. These signals are amplified and converted by the flip-flop 254 and the delay line 256 into clock signals in a manner similar to that described above for the flip-flop 154 and delay line 156 in Figure 1. The clock signals produced on the left output terminal of the flip-flop 254 then pass to the counter 260. The counter 260 operates to indicate at any instant the number of positions which have moved on the card 10 past the transducing member 249.

When all of the positions on the card 10 or at least a particular number of positions on the card have moved past the transducing member 249, the counter 260 produces an output signal which is introduced to the right input terminal of the flip-flop 262. This signal triggers the flip-flop 262 to its "false" state, as represented by a relatively high voltage on the right output terminal of the flip-flop and a relatively low voltage on the left output terminal of the flip-flop. The low voltage on the left output terminal of the flip-flop 262 is instrumental in cutting off the tube 244 so that no further current can flow through a circuit including the spring 238 and the tube.

By interrupting the flow of current through the spring 238, the pivotal force exerted on the spring becomes interrupted and the spring returns to a position blocking the mouth at the upper end of the chamber 206 from communication with the atmosphere. This causes the piston 208 to return to the position shown in Figure 6 and a restraining force to be exerted on the trailing edges of the cards 10 in the stack 12 in a manner similar to that described above. In this way, cards can be withdrawn on an intermittent basis from the stack 12 only upon the introduction of signals from the source 264.

It should be appreciated that the particular arrangement shown in Figures 1 and 6 for actuating the spring members 130 and 140 in Figure 1 and the spring member 238 in Figure 6 are only by way of illustration and that other apparatus can also be used. For example, the spring members can be mechanically connected to armatures positioned above the spring members. The armatures can be actuated by solenoids connected in series circuits with the tubes associated with the spring members. By way of illustration, one solenoid would be in a series circuit with the voltage source 172 and the tube 168 in Figure 1 so as to become energized when the tube becomes conductive. When the solenoid becomes energized, it actuates its associated armature and lifts the spring 140 to the position shown in broken lines in Figure 1.

The apparatus described above has several important advantages. It obtains an intermittent withdrawal of information cards from an input stack to a rotatable drum without requiring the use of any moving parts in juxtaposition to the drum. The apparatus obtains an intermittent withdrawal of cards from the input stack by controlling the production of fluid pressures which are exerted on the card in a direction for restraining any movements of the card from the input stack.

It should be appreciated that the term "transport means" as used in the claims is intended to include drums as well as any other type of conveyor for the cards. It should also be appreciated that the term "cards" is intended to include any type of discrete elements capable of storing a plurality of bits of information on the elements. The term "signal" as used in the claims is intended to include any type of information which can be recorded on the cards and subsequently read from the cards.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with a plurality of cards, means for holding the cards in stacked relationship, rotatable means disposed in contiguous relationship to the cards in the card holding means to impose a friction force on the cards for removing the cards individually from the card holding means, retaining means disposed in coupled relationship to the cards in the card holding means at the trailing ends of the cards for producing a friction force against the cards of a greater intensity than the friction force exerted by the rotatable means against the cards and in an opposite direction to the force produced by the rotatable means to retain the cards in the card holding means, means coupled to the retaining means for interrupting the friction force produced by the retaining means to obtain a removal of at least one card by the rotatable means from the card holding means, and means operatively coupled to the retaining means for reinstituting the friction force by the retaining means after the removal of the cards by the rotatable means to prevent any further removal of cards by the rotatable means from the card holding means.

2. In combination for use with a plurality of cards each constructed to store a plurality of bits of signal information, means for holding the cards in stacked relationship, a rotatable drum disposed relative to the cards in the card holding means to remove cards by friction from the holding means in the order of their disposition in the holding means, means disposed in coupled relationship to the cards in the card holding means for obtaining a controlled flow of fluid and for using the fluid flow to impose a force on the cards in the card holding means at the trailing ends of the cards for preventing the removal of the cards from the card holding means, transducing means disposed in coupled relationship to the cards removed from the card holding means to process particular information on such cards, and means coupled to the card holding means and responsive to the signal information processed by the transducing means for interrupting the fluid flow at particular times in accordance with the processed signal information to obtain a controlled removal of the cards by the drum from the card holding means.

3. In combination for use with a plurality of cards each constructed to store a plurality of bits of signal information, means for holding the cards in stacked relationship, a rotatable drum disposed in contiguous relationship to the cards in the card holding means for removing the cards from the card holding means, means for producing a vacuum force on the periphery of the drum to obtain a withdrawal of the cards from the card holding means to the drum and a fixed positioning of the card on the periphery of the drum during the drum rotation, means for producing a second vacuum force on the cards in the card holding means in an opposing relationship to the vacuum force produced by the drum to prevent the removal of the cards by the drum, and means for interrupting the imposition of the second vacuum force on the drum at particular times in accordance with the signal information on the cards for a removal of cards by the drum.

4. In combination for use with a plurality of cards each constructed to store a plurality of bits of signal information, means for holding the cards in stacked relationship, a rotatable drum disposed in frictional relationship to the cards in the card holding means to obtain a removal of cards from the drum, a valve having first and second positions, means operative in the first position of the valve for exerting against the cards a force opposing the removal of the cards from the card holding means, means operative in the second position of the valve for interrupting the opposing force to obtain a withdrawal of the cards from the card holding means to the drum, and means including electrical circuitry for controlling the operation of the valve in its first and second positions in accordance with the signal information on the card to obtain an intermittent withdrawal of cards from the card holding means.

5. In combination for use with a plurality of cards each constructed to store a plurality of bits of signal information, means for holding the cards in stacked relationship, a rotatable drum disposed in contiguous relationship to the cards at the forward end of the cards in the direction of drum rotation to exert a frictional force for removing the cards from the card holding means, means for providing a vacuum force on the periphery of the drum to retain the cards in fixed position on the drum during the drum rotation, means disposed in contiguous relationship to the cards in the card holding means at a retarded position in the direction of drum rotation to provide a vacuum force against the cards for opposing the withdrawals of the cards by the drum, and means for providing a by-pass at particular times in accordance with the signal information on the cards to prevent the exertion of a retarding force for the individual withdrawal of cards at these times.

6. In combination for use with a plurality of cards each constructed to store a plurality of bits of signal information, means for holding the cards in stacked relationship, a rotatable drum disposed in contiguous relationship to the cards to remove the cards by friction from the card holding means, means including a pump for creating a pneumatic force for maintaining the cards in fixed position on the periphery of the drum upon their removal from the card holding means, means including the pump for imposing a pneumatic force on the cards to restrain the cards from removal of the drum from the card holding means, and means for providing a by-pass of the pneumatic force from the cards at particular times in accordance with the signal information on the cards to obtain an intermittent transfer of the cards from the card holding means to the drum.

7. In combination for use with a plurality of cards each constructed to store a plurality of bits of signal information, means for holding the cards in stacked relationship, a rotatable drum disposed in contiguous relationship to the cards in the card holding means at a forward position on the cards in the direction of drum rotation to impose a frictional force on the cards for a removal of the cards from the card holding means, means disposed in contiguous relationship to the cards in the card holding means at a retarded position on the cards in the direction of drum rotation to impose a frictional force on the cards for a retention of the cards in the card holding means, means for normally obtaining an imposition of the opposing force to prevent any removal of the cards from the card holding means, and means including electrical circuitry for obtaining a temporary interruption of the opposing force in accordance with the signal information on the cards to obtain an intermittent release of one or more cards from the card holding means.

8. In combination with a plurality of cards each constructed to store a plurality of bits of signal information, means for holding a plurality of cards in stacked relationship, a rotatable drum disposed in contiguous relationship to the cards in the card holding means to remove the cards by friction from the stack, a piston, means associated with the piston for obtaining a controlled action on the cards in opposition to the frictional force exerted on the cards for removing the cards, means for normally obtaining a first positioning of the piston to produce the opposing force on the cards, means including electrical circuitry and a driving member operative upon the activation of the electrical circuitry for moving the piston into a second position for an interruption of the opposing force to obtain a removal of at least one card from the drum upon each activation of the electrical circuitry, and means for obtaining an activation of the electrical circuitry at particular times in accordance with the signal information on the cards.

9. In combination for use with a plurality of cards each constructed to store a plurality of bits of signal information, means for holding the cards in stacked relationship, a rotatable drum disposed in contiguous relationship to the card holding means, means for producing a vacuum in the drum to remove the cards by friction from the card holding means, a retainer disposed in contiguous relationship to the cards in the card holding means, means for producing a vacuum in the retainer to press the cards against the retainer for the production of a frictional force opposing the force exerted by the drum against the cards, and means for interrupting the vacuum force exerted by the retainer at particular times in accordance with the signal information on the cards to obtain an intermittent transfer of cards from the card holding means to the drum.

10. In combination for use with a plurality of cards each constructed to store a plurality of bits of signal information, means for holding the cards in stacked relationship, a rotatable drum disposed in contiguous relationship to the cards in the card holding means, means for producing a vacuum on the periphery of the drum to produce a friction force on the cards for removing the cards from the card holding means, a chamber, a member associated with the chamber to close the chamber in one position of the member for the production of a vacuum in the chamber and to open the chamber to atmospheric pressure in a second position of the member, a retainer having at least one orifice in communication with the chamber to receive vacuum or atmospheric pressure in accordance with the pressure in the chamber, the retainer being disposed in contiguous relationship to the cards in the card holding means to produce a friction force on the cards for retaining the cards in the card holding means upon the creation of a vacuum pressure in the retainer, and means including electrical circuitry for interrupting the vacuum pressure in the retainer at particular times in accordance with the signal information on the cards to obtain a withdrawal of cards from the card holding means during such interruptions.

11. In combination for use with a plurality of cards each constructed to store a plurality of bits of signal information, means for holding the cards in stacked relationship, a rotatable drum disposed in contiguous relationship to the cards in the card holding means, there being slots in the periphery of the drum and passageways extending through the drum, means for producing a vacuum and for coupling the vacuum means to the drum to produce a vacuum effect on the periphery of the drum through the slots and passageways in the drum for the exertion of a friction force by the drum on the cards to obtain a removal of the cards from the card holding means, a retainer disposed in contiguous relationship to the cards in the card holding means, there being at least one orifice in the retainer and passageways communicating with the orifice, means for coupling the vacuum means to the retainer to produce a vacuum effect in the orifice through the passageways in the retainer for the exertion of a friction force by the retainer on the cards to restrain the removal of the cards from the card holding means, and means including electrical circuitry for interrupting the production of the vacuum effect in the retainer at particular times in accordance with the signal information on the cards to obtain a transfer of cards from the card holding means to the drum at such times.

12. In combination for use with a plurality of cards each constructed to store a plurality of bits of signal information, means for holding the cards in stacked relationship, a rotatable drum disposed in contiguous relationship to the cards in the card holding means, there being slots in the periphery of the drum and passageways extending through the drum, means for producing a vacuum, means for coupling the vacuum means to the drum to produce a vacuum effect on the periphery of the drum through the slots and passageways in the drum for the exertion of a friction force by the drum on the cards to obtain a removal of the cards from the card holding means, a retainer disposed in contiguous relationship to the cards in the card holding means, there being at least one orifice in the retainer and passageways communicating with the orifice, a chamber, a piston in the chamber and a spool connected to the piston, a pivotable member associated with the chamber to block the chamber from communication with the atmosphere in one position and to open the chamber to the atmosphere in a second position, means associated with the piston for providing a first communication between the chamber and the retainer orifice in a first position of the piston to couple the vacuum means to the retainer for the imposition of a restraining force on the cards and for providing a second communication between the chamber and the retainer orifice in a second position of the piston to couple the retainer through the chamber to the atmosphere for the interruption of the vacuum effect, means associated with the piston for producing a movement of the piston into its first position upon a closing of the chamber and for producing a movement of the piston into its second position upon an opening of the chamber, and means including electrical circuitry for obtaining an actuation of the pivotable member from the first position to the second position at particular times in accordance with the signal information on the cards to obtain an interruption of the vacuum effect in the orifice and a predominance of the vacuum effect on the periphery of the drum for the withdrawal of a card from the card holding means to the drum.

13. In combination for use with a plurality of cards each constructed to store a plurality of bits of signal information, means for holding the cards in stacked relationship, means including transport means movable in a closed loop and disposed to remove cards by friction from the card holding means in the order of their disposition in the card holding means and to hold the cards in fixed position on the transport means after their removal from the card holding means, means including electrical circuitry for obtaining a controlled flow of fluid at first particular times in accordance with the signal information on the cards and for using the fluid flow to impose a force on the cards for preventing the transfer of the cards from the card holding means to the transfer means, and means including electrical circuitry for producing an interruption in the flow of fluid at second particular times in accordance with the signal information on the cards to obtain a removal of the cards by the transport means from the card holding means.

14. In combination for use with a plurality of cards each constructed to store a plurality of bits of signal information, means for holding the cards in stacked relationship, means including transport means movable in a closed loop and disposed in contiguous relationship to the cards in the card holding means at the leading end of the cards to remove the cards by friction from the card holding means, means including a vacuum pump for creating a pneumatic force for maintaining the cards in fixed position on the transport means upon their transfer to the transport means from the card holding means and during the movement of the transport means, means including the pump and including electrical circuitry for imposing a pneumatic force on the trailing end of the cards at first particular times in accordance with the signal information on the cards to restrain the cards from transfer from the card holding means to the transport means, and means including electrical circuitry for providing a by-pass of the pneumatic force on the trailing end of the cards at second particular times in accordance with the signal information on the cards to obtain a controlled transfer of the cards from the card holding means to the transport means.

15. In combination for use with a plurality of cards each constructed to store a plurality of bits of signal information, means for holding the cards in stacked relationship, means including transport means movable in a closed loop for imposing a force for removing the cards individually from the card holding means and for holding the cards in fixed positioning on the transport means during the movement of the transport means and after the removal of the cards from the card holding means, means coupled to the cards in the card holding means at the trailing ends of the cards for imposing a force on the cards in the card holding means of a greater intensity than the force exerted by the transport means on the cards and in a direction for retaining the cards within the card holding means, means including electrical circuitry operatively coupled to the retaining means for producing an interruption in the retaining force to obtain a transfer of cards from the card holding means to the transport means, transducing means operatively coupled to the cards on the transport means for reading particular information on the cards and means including electrical circuitry responsive to the signals from the transducing means and operatively coupled to the retaining means for obtaining a reinstatement of the retaining force after the transfer of a particular number of cards from the card holding means to the transport means.

16. In combination for use with a plurality of cards each constructed to store a plurality of bits of signal information, means for holding the cards in stacked relationship, means including transport means disposed in coupled relationship to the cards in the card holding means to obtain a transfer of cards from the card holding means to the transport means, a valve having first and second positions, means including retainer means and the valve and operative in the first position of the valve to exert against the cards a fluid force opposing the transfer of the cards from the card holding means to the transport means, means including the valve and operative in the second position of the valve to interrupt the fluid opposing force for a withdrawal of the cards from the card holding means to the transport means, transducer means disposed in coupled relationship to the transport means to provide a transducing action for the production of electrical signals in accordance with the signal information on the cards, and means including electrical circuitry and the transducing means for providing a controlled operation of the valve in the first and second positions in accordance with the transducing action of the transducing means to obtain an intermittent withdrawal of cards from the card holding means.

17. In combination for use with a plurality of cards each constructed to store a plurality of bits of signal information, means for holding the cards in stacked relationship, transport means movable in a closed loop and constructed to receive a withdrawal of air for the creation of a vacuum force at its periphery to hold the cards in fixed position on the periphery of the transport means during the movement of the transport means and disposed in contiguous relationship to the leading end of the first card in the card holding means to impose a force for the transfer of the card from the card holding means, a retainer disposed in contiguous relationship to the trailing end of the first card in the card holding means and constructed to receive a withdrawal of air for the creation of a force for retaining the card in the card holding means, a vacuum pump for producing a vacuum at the periphery of the transport means and in the retainer, a valve having first and second positions and operative in the first position to couple the vacuum pump to the retainer for the creation of a vacuum force in the retainer and operative in the second position to by-pass the vacuum pump from the retainer for the creation of atmospheric pressure in the retainer, means including electrical circuitry for operating on the valve at first particular times in accordance with the signal information on the cards to maintain the valve in the first position, and means including electrical circuitry for operating on the valve at second particular times in accordance with the signal information on the cards to actuate the valve to the second position.

18. In combination for use with means for holding a plurality of information storage cards in stacked relationship and with movable transport means disposed in contiguous relationship to the card holding means for obtaining a transfer of cards from the card holding means, a retainer disposed in contiguous relationship to the cards in the card holding means and to the transport means and having a surface extending along the trailing portion of the first card in the card holding means and having at least one orifice which extends from this surface and which communicates with conduits extending through the retainer, and means including a vacuum pump for obtaining a withdrawal of air through the orifice and the conduit of the retainer to produce a force on the trailing end of the first card in the card holding means at particular times for the retention of the card in the card holding means against the action of the transport means on the card.

19. In combination for use with means for holding a plurality of information storage cards in stacked relationship and with transport means movable in a closed loop and disposed in contiguous relationship to the card holding means for obtaining a transfer of cards from the card holding means, a retainer having a surface disposed in contiguous relationship to the trailing portion of the leading card in the card holding means and having at least one orifice disposed in the surface and having at least one conduit extending from the orifice through the retainer, a pump for creating a vacuum, a line extending between the pump and the conduit, and a valve disposed in the line and having first and second positions and operative in the first position to couple the pump to the orifice in the retainer for the creation of a vacuum force for retaining the cards in the card holding means and operative in the second position to by-pass the retainer and to introduce air at atmospheric pressure to the orifice in the retainer for the withdrawal of cards from the card holding means by the transport means.

20. In combination for use with a plurality of cards each constructed to store a plurality of bits of signal information, means for holding the cards in stacked relationship, transport means for the cards and disposed in coupled relationship to the cards in the card holding means at a leading position on the cards to obtain a transfer of the cards from the card holding means to the transport means, means disposed in contiguous relationship to the cards in the card holding means at a trailing position on the cards in the card holding means to provide a pneumatic force against the cards to prevent the cards from being transferred to the transport means from the card holding means, and means coupled to the last mentioned means for controlling the imposition of the pneumatic force in accordance with the signal information on the cards to obtain a controlled transfer of cards from the card holding means to the transport means.

21. In combination for use with a plurality of cards each constructed to store a plurality of bits of signal information, means for holding the cards in stacked relationship, transport means for the cards and coupled to the cards in the card holding means to obtain a removal of cards from the card holding means, means including a card retainer disposed in coupled relationship to the cards in the card holding means for obtaining a controlled flow of fluid and for using the flow of fluid to impose a force on the cards for preventing the removal of the cards from the card holding means, and means for interrupting the flow of fluid at particular times in accordance with the signal information on the cards to obtain a removal of the cards from the card holding means to the transport means.

22. In combination for use with a plurality of cards each constructed to store a plurality of bits of signal information, means for holding the cards in stacked relationship, transport means for the cards and coupled to the cards in the holding means for obtaining a removal of the cards from the holding means, a card retainer coupled to the cards for exerting a force for retaining the cards and for exerting this force with an intensity to retain the cards in the card holding means, means including electrical circuitry coupled to the card retainer and responsive to the signal indications on the transported cards to produce an interruption in the force produced by the card retainer in accordance with the signal information on the cards to obtain a removal of cards from the card holding means to the transport means.

23. In combination for use with a plurality of cards each constructed to store a plurality of bits of signal information, means for holding the cards in stacked relationship, means disposed in coupled relationship to the cards in the holding means at the leading ends of the cards to obtain a transfer of the cards from the card holding means and to obtain a controlled movement of the cards upon their transfer from the card holding means, means including a retainer disposed in coupled relationship to the cards in the card holding means at the trailing ends of the cards and including a vacuum pump for producing a vacuum in the retainer to press the trailing ends of the cards against the retainer for the production of a frictional force opposing the transfer of cards from the transport means, and means coupled to the retainer for interrupting the vacuum in the retainer at particular times in accordance with the signal information on the cards to obtain a controlled transfer of cards from the card holding means to the card moving means.

24. In combination for use with a plurality of cards each constructed to store a plurality of bits of signal information, means for holding the cards in stacked relationship, means disposed in coupled relationship to the cards in the holding means to obtain a transfer of the cards from the card holding means and to obtain a controlled movement of the cards upon their transfer from the card holding means, a valve including a piston having first and second positions, means coupled to the valve and to the cards in the card holding means and operative in the first position of the valve piston for providing for a flow of fluid to exert against the cards in the card holding means a force opposing the removal of the cards from the card holding means, means coupled to the valve and operative in the second position of the valve piston for interrupting the flow of fluid to obtain a transfer of cards from the card holding means to the card moving means, and means including electrical circuitry coupled to the valve for controlling the operation of the valve in its first and second positions in accordance with the signal information on the cards to obtain an intermittent transfer of cards from the card holding means to the card moving means.

References Cited in the file of this patent

UNITED STATES PATENTS

| | | |
|---|---|---|
| 805,158 | Sage | Nov. 21, 1905 |
| 1,040,025 | Schlesinger | Oct. 1, 1912 |
| 2,693,957 | Welsh | Nov. 9, 1954 |
| 2,795,328 | Tyler et al. | June 11, 1957 |

UNITED STATES PATENT OFFICE
CERTIFICATE OF CORRECTION

Patent No. 2,927,791                                              March 8, 1960

Hans M. Stern

It is hereby certified that error appears in the printed specification of the above numbered patent requiring correction and that the said Letters Patent should read as corrected below.

Column 15, line 13, for "of" read -- by --; column 20, line 4, before "means", second occurrence, insert -- and --.

Signed and sealed this 27th day of September 1960.

(SEAL)
Attest:

KARL H. AXLINE                                            ROBERT C. WATSON
Attesting Officer                                          Commissioner of Patents